(12) United States Patent
Phillips

(10) Patent No.: US 7,526,559 B1
(45) Date of Patent: Apr. 28, 2009

(54) TRANSFER OF WEB APPLICATIONS BETWEEN DEVICES

(75) Inventor: Anthony H. Phillips, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/059,720

(22) Filed: Mar. 31, 2008

(51) Int. Cl.
*G06F 15/16* (2006.01)

(52) U.S. Cl. ............... 709/227; 709/203; 709/220; 709/228

(58) Field of Classification Search ........... 709/203, 709/220–222, 227–229
See application file for complete search history.

(56) References Cited

U.S. PATENT DOCUMENTS

| | | | |
|---|---|---|---|
| 7,401,131 B2 * | 7/2008 | Robertson et al. | 709/220 |
| 2003/0120719 A1 * | 6/2003 | Yepishin et al. | 709/203 |
| 2003/0120762 A1 * | 6/2003 | Yepishin et al. | 709/223 |
| 2003/0195963 A1 | 10/2003 | Song et al. | |
| 2005/0066037 A1 * | 3/2005 | Song et al. | 709/227 |

\* cited by examiner

*Primary Examiner*—Phuoc Nguyen
(74) *Attorney, Agent, or Firm*—Dillon & Yudell LLP

(57) ABSTRACT

A runtime state of a web application running on a first device is serialized and transferred to a second device. The serialized runtime state is loaded into a browser on the second device to establish a connection between the second device and the web application.

1 Claim, 3 Drawing Sheets

TRANSFER OF WEB APPLICATIONS BETWEEN DEVICES

BACKGROUND OF THE INVENTION

1. Technical Field

The present disclosure relates in general to the field of computers, and more particularly to the use of computer software. Still more particularly, the present disclosure relates to web-based applications.

2. Description of the Related Art

Computer users often have access to mobile devices (such as personal digital assistants, laptops, mobile phones, etc.) as well as their desktop computers. Such computer users may wish to continue working with a web-based application after leaving their desktop computers. Transferring access to such a web-based application from a desktop to a mobile device (or more generally, between any two computers) in a seamless manner is currently not feasible using existing technology and processes.

SUMMARY OF THE INVENTION

The present invention provides a method for making an application portable from a first browser-based device to a second browser-based device. A runtime state of a web application running on a first device is serialized and transferred to a second device. The serialized runtime state is loaded into a browser on the second device to establish a connection between the second device and the web application.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
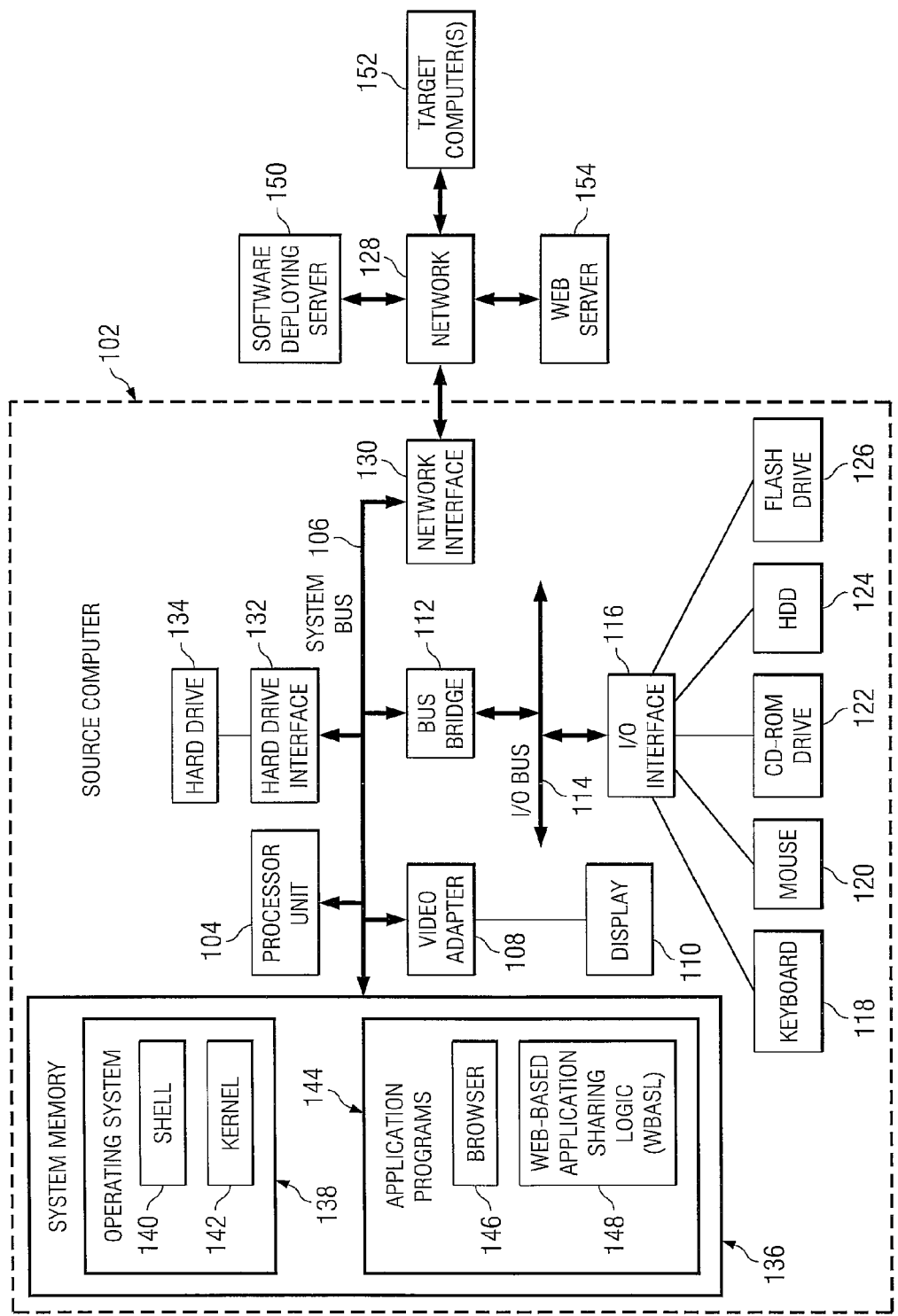
FIG. 1 illustrates an exemplary computer in which the present invention may be utilized.

With reference now to FIG. 1, there is depicted a block diagram of an exemplary source computer 102, in which the present invention may be utilized. Note that some or all of the exemplary architecture shown for source computer 102 may be utilized by a target computer 152, a web server 154, and/or a software deploying server 150.

Source computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Source computer 102 is able to communicate with target computer 152, web server 154 and/or software deploying server 150 via a network 128 using a network interface 130, which is coupled to system bus 106. Network 128 may be an external network such as the Internet, an internal network such as an Ethernet or a Virtual Private Network (VPN), or a wireless network, such as a cell phone network.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using Hyper-Text Transfer Protocol (HTTP) messaging, thus enabling communication with software deploying server 150. Note that the present invention may also utilize an Intranet system.

Application programs 144 in source computer 102's system memory (as well as software deploying server 150's system memory and target computer 152's system memory) also include a Web-Based Application Sharing Logic (WBASL) 148. WBASL 148 includes code for implementing the processes described in FIGS. 2-4. In one embodiment, source computer 102 is able to download WBASL 148 from software deploying server 150, including in an "on demand" basis.

Web server 154 is capable of deploying and executing web-based applications (e.g., browser-based applications), both in the source computer 102 and the target computer 152.

The hardware elements depicted in computer 102 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
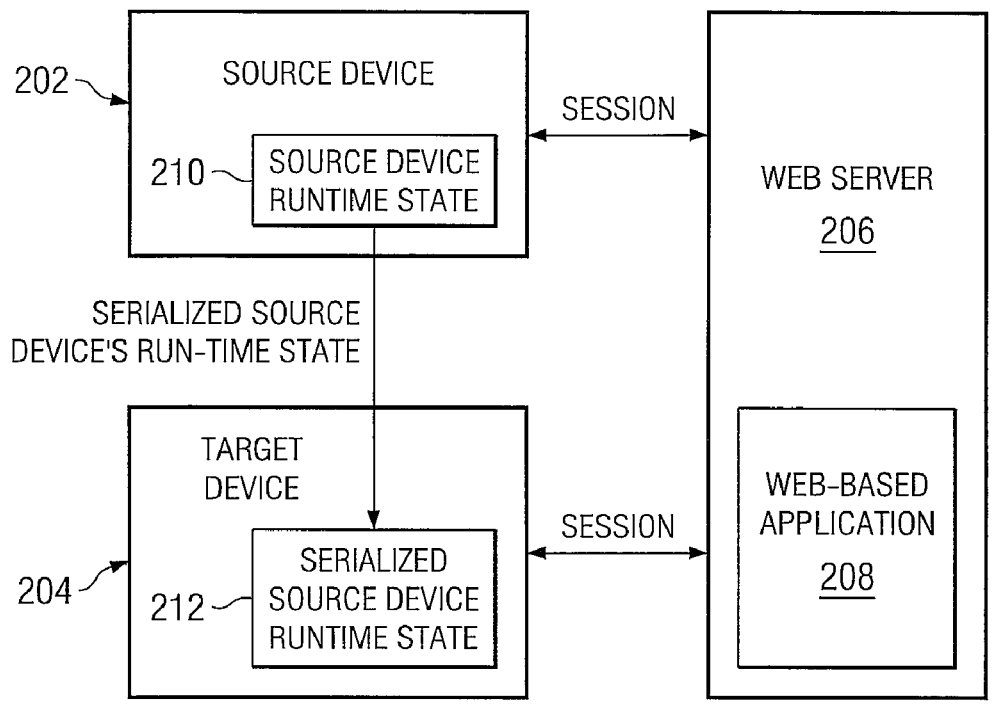
FIG. 2 depicts a relationship between a source device, a target device and a web server in accordance with the present invention.

With reference now to FIG. 2, an overview of a relationship between a source device 202 (e.g., source computer 102 shown in FIG. 1), a target device 204 (e.g., target computer 152 shown in FIG. 1), and a web server 206 (e.g., web server 154 shown in FIG. 1) is illustrated. While the source device 202 is in a session with a web-based application 208 found in the web server 206, source device runtime state 210 is maintained within the source device 202. This source device runtime state 210 is state data related to the session with the web-based application 208. Source device runtime state 210 includes, but is not limited to, a Hypertext Markup Language (HTML) document object model (DOM), a client-side virtual machine that is created using a scripted language, a Hypertext Transfer Protocol (HTTP) cookie used for authenticating, tracking, and maintaining specific information about a user of the application during the connection between the first browser-based device (e.g., source device 202) and the application (e.g., the web-based application 208), and a browser application state that describes a browse history of the user on the first browser-based device.

When a user desires to transfer a session with the web-based application 208 from the source device 202 to the target device 204, the source device runtime state 210 (for the session between the source device 202 and the web-based application 208) is serialized and transferred to the target device 204 as a serialized source device runtime state 212, which can be used as the runtime state in the target device 204 when a new session is established between the target device 204 and the web-based application 208 in the web server 206.

Figure 3:
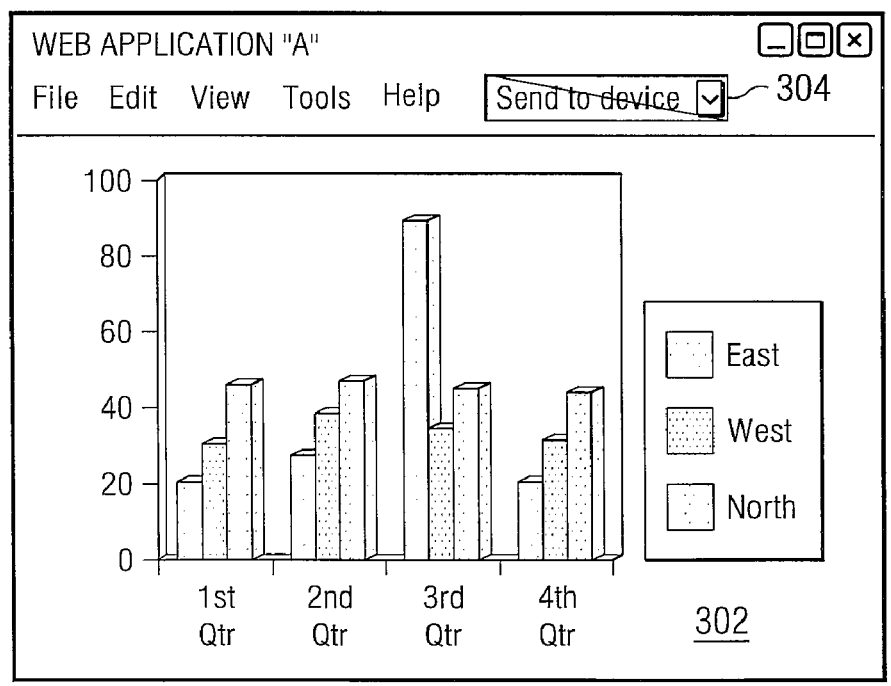
FIG. 3 illustrates an exemplary Graphical User Interface (GUI) on the source device, which includes an active button for transmitting serialized runtime state to the target device.
Figure 4:
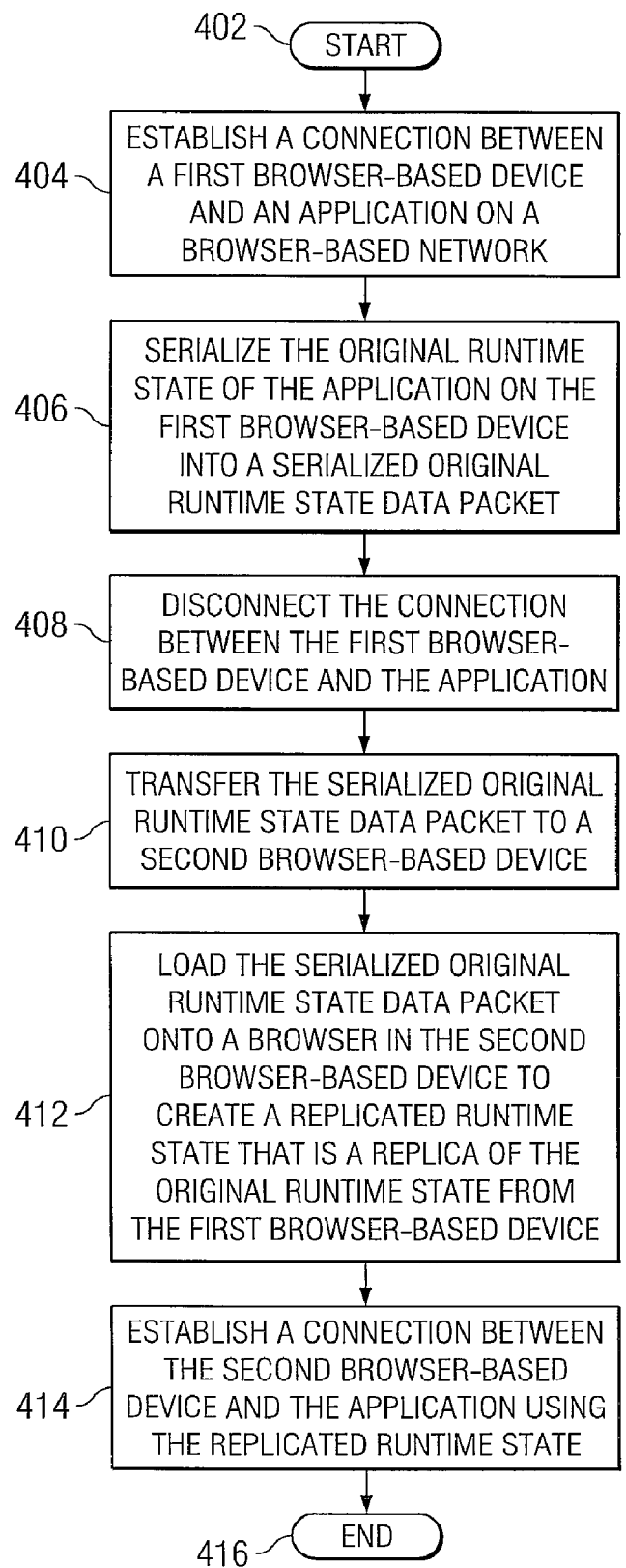
FIG. 4 is a high-level flow-chart of steps taken to serialize and transmit runtime state, for a web application, from the source device to the target device.

Referring now to FIG. 3, assume that the source device 202 shown in FIG. 2 is running a web-based application named "Web Application "A"". This web-based application displays a graphical user interface 302, which shows data being graphed. If the user of the source device desires to "push" the web application to a mobile device (e.g., target device 204 shown in FIG. 2), then the user clicks the button 304, which results in the source device's runtime state being serialized and transmitted to the target device (which may be identified by a drop-down menu, not shown, that appears when the button 304 is clicked). The target device is then able to load the serialized original runtime state data packet into a browser in the target device to create a replicated runtime state that is a replica of the original runtime state from the first browser-based device. This allows the target device to establish a connection between the target device and the application using the replicated runtime state and continue using the application where the user left off Referring now to FIG. 4, a high-level flow chart of exemplary steps taken to transfer a web-based application session from a first device to a second device is presented. After initiator block 402, a connection is established between a first browser-based device and an application on a browser-based network (block 404). The first browser-based device maintains an original runtime state during the connection to the application. The original runtime state includes, but is not limited to, a Hypertext Markup Language (HTML) document object model (DOM); a client-side virtual machine that is created using a scripted language; a Hypertext Transfer Protocol (HTTP) cookie used for authenticating, tracking, and maintaining specific information about a user of the application during the connection between the first browser-based device and the application; and a browser application state that describes a browse history of the user on the first browser-based device. As described in block 406, the original runtime state is serialized into a serialized original runtime state data packet. The connection between the first browser-based device and the application is disconnected (block 408), and the serialized original runtime state data packet is transferred to a second browser-based device (block 410). The serialized original runtime state data packet is then loaded into a browser in the second browser-based device to create a replicated runtime state (block 412). Note that the replicated runtime state is a replica of the original runtime state from the first browser-based device. As described in block 414, a connection is then established between the second browser-based device and the application using the replicated runtime state. The process ends at terminator block 416.

Note that the present invention has been described primarily as "pushing" the runtime state data from the source device to the target device. That is, in "push mode," the user working in a browser chooses to transfer their work to a selected device. The browser state is serialized and sent to a listening device (e.g., logic such as WBASL 148 shown in FIG. 1 or a dedicated listening port/socket—not shown). This data transfer can be achieved using a variety of network technologies (Local Area Networks, infrared or short-distance radio wave communication, etc.). The listening device then starts a new instance of the local browser and initiates the loading of the application state. Once the application state is loaded, the user can continue working with no interruption. "Push mode" therefore requires the user to send the serialized runtime state data to a particular target device, which is known when the runtime data is serialized.

In "pull mode," the user working in a browser chooses to suspend her work. The browser state is serialized and then stored in the source device. At a later time, the user initializes a new instance of the browser in the target device, and requests the serialized runtime state data from the source device. This allows the user to "pull" the runtime state from the source device into any target device. An intermediary such as a web server may store the serialized state in pull mode. For example, the user may save the browser state on her work computer to an Internet web server (preferably in a secure manner) and then load it into a browser on another computer (e.g., a home computer) later on.

Thus, as described herein, the present invention provides for a method of making an application portable from a first browser-based device to a second browser-based device. In a preferred mode, the method starts by establishing a connection between a first browser-based device and an application on a browser-based network. The first browser-based device maintains an original runtime state for the application during the connection to the application. The original runtime state includes a Hypertext Markup Language (HTML) document object model (DOM); a client-side virtual machine that is created using a scripted language; a Hypertext Transfer Protocol (HTTP) cookie used for authenticating, tracking, and maintaining specific information about a user of the application during the connection between the first browser-based device and the application; and a browser application state that describes a browse history of the user on the first browser-based device. The method continues by serializing the original runtime state into a serialized original runtime state data packet. The connection between the first browser-based device and the application on the browser-based network is disconnected, and the serialized original runtime state data packet is transferred to a second browser-based device. The serialized original runtime state data packet is then loaded onto a browser in the second browser-based device to create a replicated runtime state, such that the replicated runtime state is a replica of the original runtime state from the first browser-based device. A connection is then established between the second browser-based device and the application using the replicated runtime state.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of making an application portable from a first browser-based device to a second browser-based device, the method comprising:

establishing a connection between a first browser-based device and an application on a browser-based network, wherein the first browser-based device maintains an original runtime state for the application during the connection to the application, and wherein the original runtime state comprises:
- a Hypertext Markup Language (HTML) document object model (DOM),
- a client-side virtual machine that is created using a scripted language,
- a Hypertext Transfer Protocol (HTTP) cookie used for authenticating, tracking, and maintaining specific information about a user of the application during the connection between the first browser-based device and the application, and
- a browser application state that describes a browse history of the user on the first browser-based device;

serializing the original runtime state into a serialized original runtime state data packet;

disconnecting the connection between the first browser-based device and the application on the browser-based network;

transferring the serialized original runtime state data packet to a second browser-based device;

loading the serialized original runtime state data packet onto a browser in the second browser-based device to create a replicated runtime state, wherein the replicated runtime state is a replica of the original runtime state from the first browser-based device; and establishing a connection between the second browser-based device and the application using the replicated runtime state.

* * * * *